Feb. 17, 1970   K. E. MAYO   3,496,026
THERMOELECTRIC GENERATOR
Filed April 26, 1965   3 Sheets-Sheet 1

INVENTOR
KENNETH E. MAYO
BY
ATTORNEY

INVENTOR
KENNETH E. MAYO
ATTORNEY

Feb. 17, 1970 K. E. MAYO 3,496,026
THERMOELECTRIC GENERATOR
Filed April 26, 1965 3 Sheets-Sheet 3

INVENTOR

KENNETH E. MAYO

BY *[signature]*

ATTORNEY

United States Patent Office 3,496,026
Patented Feb. 17, 1970

3,496,026
THERMOELECTRIC GENERATOR
Kenneth E. Mayo, Nashua, N.H., assignor to Sanders Associates, Inc., Nashua, N.H., a corporation of Delaware
Filed Apr. 26, 1965, Ser. No. 450,847
Int. Cl. H01v 1/30; G21h 1/10
U.S. Cl. 136—202                    22 Claims

ABSTRACT OF THE DISCLOSURE

A power supply for unattended use in the ocean is herein disclosed. The apparatus comprises a thermoelectric generator powered by a heat producing radioisotope fuel capsule and having the cold junction thereof in communication with the ocean water. Unneeded thermal energy librated from the fuel capsule is dissipated by a heat dump having no moving parts which is sensitive to the pressure existing in the environment surrounding the power supply. The thermoelectric generator is mounted in a shock resistant suspension system.

This invention relates to a power supply capable of extended unattended use in remote environments.

More particularly, this invention relates to an airdropped, light-weight, power supply for unattended use at ocean depths.

In recent years the oceans of the earth have been involved in an ever-increasing technological study. Today the need for a comprehensive study of the ocean and of weather has brought about a specific need to make scientific observations at all points of the globe. Because of the climates involved, the distances encountered, and the expense of sending ships through these distances, a study of the ocean and of weather patterns is now planned by means of unmanned buoys packaged with electronic gear capable of making studies of the ocean's environment and relaying these studies through a telemetering system for further study on the continents. Because of the distances involved and the varying climates, it has become advantageous to rely on air-dropped, unmanned buoys which may be placed in remote areas and have contained therein relatively light-power supply units; by relatively lightweight is meant thirty pounds or less to produce ten watts of power or more, the total weight of the buoy and power supply being a thousand pounds or less. To this date there has not been available, until the invention described hereafter, a power supply of such light weight which also has a power output life in the order of six months to a year, and which is suited to the economic and quantity availability requirements dictated by these applications.

The invention, which provides the light-weight, long-life power supply that meets the above needs, utilizes a unique combination of thermoelectric electrical power generators mounted in a novel, compact, shock-resistant suspension system that carries a thermal energy source arranged to deliver thermal energy in a manner which advances the state of the art. The entire system specially meets the requirements of trouble-free, extremely reliable remote power generation with a very low cost-per-watt of power produced over a long period of time.

In addition, the invention also contemplates the use of a unique heat dump to dissipate unneeded thermal energy liberated from a heat-producing radioisotope fuel capsule. The isotope is relied upon to supply the thermal energy needed to produce electrical energy in a thermoelectric conversion unit. In the instant application the isotope, thulium-170, which has a half-life of approximately one hundred and twenty-seven days, is utilized. It is apparent that, in order to have a predetermined power output at some distant time, a supply of the isotope must be of a size such that upon decay there will still remain sufficient thermal energy to generate the needed electrical powers. This means that at the outset there will be a great excess of thermal energy present that must be efficiently dissipated. As time passes, the rate of heat dissipation must be controlled in order that near the end of the isotope's useful life, the highest possible portion of the energy the isotope is liberating is directly converted into electrical energy. This requires that the means to dissipate the heat must turn itself off in order to conserve the thermal energy. The unique heat-dissipating unit, or heat dump, embodied in this invention provides the solution to this problem. The problem is solved without the need for any mechanical moving parts, over a broader range of thermal energy levels than has been possible with previous methods, and in a totally automatic manner. Two methods of dissipating the heat will be illustrated, the second embodiment being the preferred.

It is therefore an object of this invention to provide an inexpensive, light-weight, long-lived power supply that utilizes a thermoelectric power generator to provide electrical power.

Another object of this invention is to provide an improved shock-resistant suspension system for a thermoelectric power plant, which must be capable of withstanding tremendous shock loading, due to being air-dropped from high-speed aircraft.

Yet another object of this invention is to provide a new and improved manner of mounting an isotope thermal energy source to thereby provide maximum utilization of the thermal energy for conversion to electrical energy.

Another object of this invention is to provide a unique heat-dissipating unit that functions in a wholly automatic manner.

Another object of this invention is to provide a heat-dissipating unit or heat dump that can be utilized with a large variety of heat-liberating sources, which sources vary over a wide range with reference to the amount of heat liberated by each source.

Another object of this invention is to provide an improved cold junction which utilizes an electrical insulated outer surface which permits maximum thermal conductivity while simultaneously electrically insulating.

The invention accordingly comprises the features of construction, combination of elements, and arrangement of parts which will be exemplified in the construction hereafter set forth, and the scope of the invention will be indicated in the claims.

For a fuller understanding of the nature and objects of the invention, reference should be had to the following detailed description, taken in connection with the accompanying drawings, in which.

Figure 1:
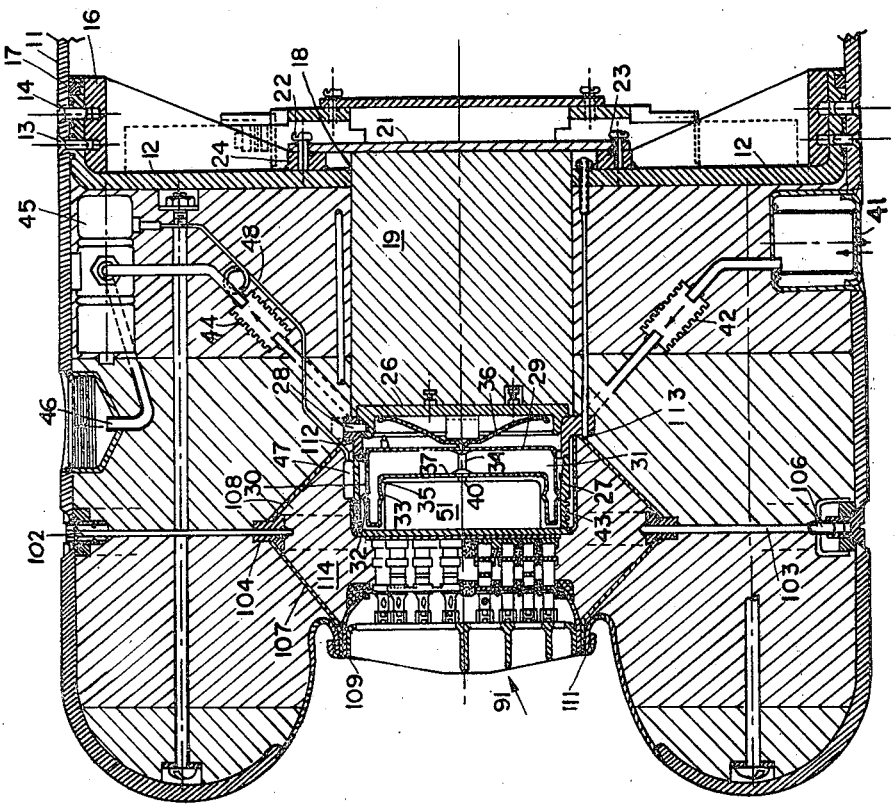
FIG. 1 is a cross-section of the thermoelectric power generator embodying the invention (except the preferred heat dump)
Figure 2:
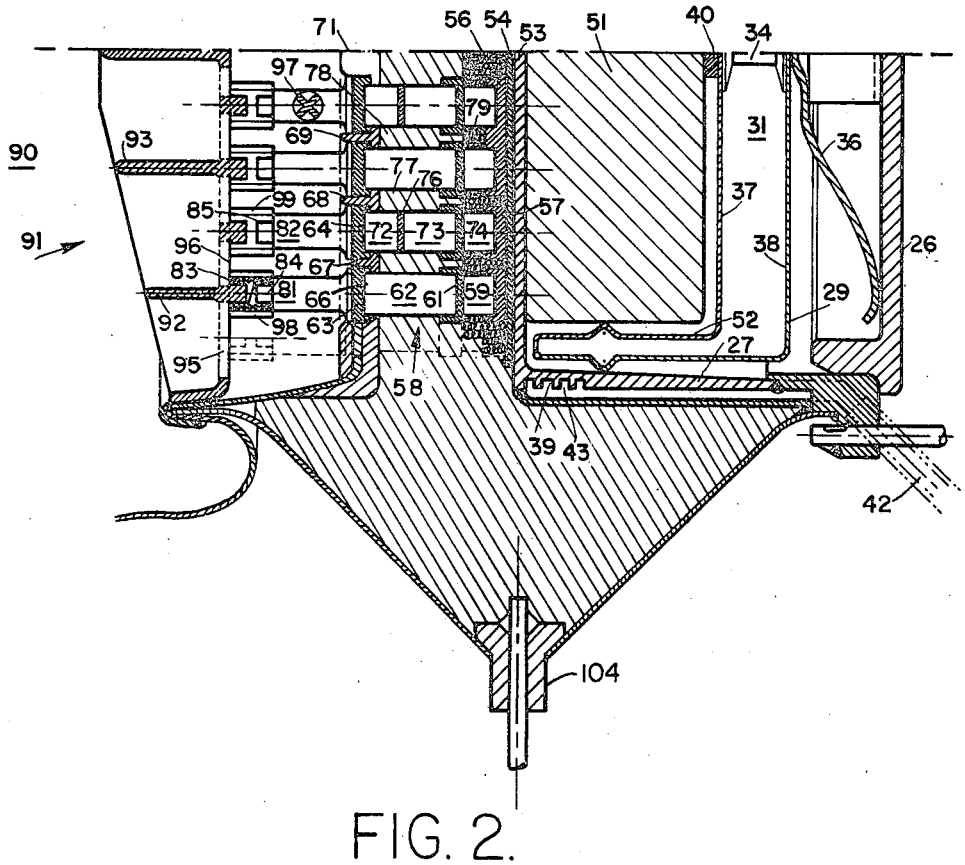
FIG. 2 is an enlarged section of a portion of FIG. 1 showing in greater detail the internal arrangement of the thermoelectric power generator's internal mechanism.

Reference now is made to FIGS. 1 and 2 in which there is illustrated the power supply which is the subject of the invention to be described hereafter.

A cylindrical housing 11 totally surrounds the unit and at the right-hand end a circular support plate 12 is securely fastened to the cylyindrical housing 11 by screws 13 and 14. Other sets of screws are peripherally located in the manner shown at the base of this figure. The screws 13 and 14 pass through a portion of the circular support plate 12 and are secured to a support block 16.

A hermetic sealing ring 17 is formed as an integral part of the junction between the circular support plate 12 and the cylindrical housing 11. A central opening 18 is located in the circular support plate 12, and through this central opening 18 an insulation block 19 is fitted. The insulation block 19 is connected to a removable cover plate 21 by means not shown, but some suitable adhesive would serve for bonding the insulation block 19 to the removable cover plate 21.

The removable cover plate 21 in turn is secured by bolts 22 and 23 to annular fastening blocks, such as 24. At the left-hand end of the insulation block 19, there is positioned a removable cover 26. This removable cover 26 fits into a cup-shaped fuel chamber 27 and the removable cover 26 is securely fastened with a bayonet-type locking pin 28.

Housed within the cup-shaped fuel chamber 27 is a thin-walled metal Dewar 29 which has an evacuated interior 31. The function of this Dewar will be explained more fully hereafter. The thin-walled Dewar 29 has raised centering elements 32 and 33 on the Dewar sides 30 and 35. These raised centering elements 32 and 33 function to centrally locate the Dewar 29 in the cup-shaped fuel chamber 27, and also center the fuel element 51 within the Dewar. The Dewar 29 is spring-loaded in a direction towards the base of the cup-shaped fuel chamber 27 by leaf spring 36.

Housed within the Dewar 29 is an isotope fuel element 51 whose precise character will be described hereafter.

The walls of the Dewar 37 and 38 are spaced apart by a ceramic support element 34, the ceramic support element being needed in view of the fact that the interior 31 is an evacuated region and the force of the leaf spring is to be transmitted to the isotope fuel element 51 through this ceramic support. The isotope fuel element 51 is in turn physically separated from the reflective surfaces 52 of the Dewar by a spacer 40.

It is important to keep in mind that this unit being described must provide electrical power for a long period of time, as noted earlier, anywhere from six months to a year. When a term of a year is involved, this means that the thermal energy possessed by the isotope fuel element will be liberated first at a higher overall temperature level and then gradually decrease as the isotope life and energy content is expended.

The reflective surfaces 52 of the Dewar are preferably plated with a metallic substance whose reflective index is highest in the spectrum of thermal energy being released by the isotope fuel element 51. This utilization of matching reflective index noted above provides an environment in which substantially all of the thermal energy being released by the isotope fuel element 51 is directed in but one direction, and that direction is determined by the opening of the cup-shaped Dewar which holds the fuel element 51.

Prior art contributions in this area have failed to recognize that thermal energy in a fuel element may best be utilized by directing substantially all of the thermal energy in the direction of thermoelectric elements which in turn will convert the thermal energy to electrical energy. In the past, devices that produced electrical power from isotope fuels have relied on thermally insulating layers to capture and contain the escape of thermal energy from the fuel element, or alternative arrangements have been provided wherein the thermoelectric elements are positioned about the outer periphery of the fuel element with the thought of capturing a portion of the thermal energy released by the fuel element. The designs have not made the heat follow a predetermined direction; in other words, the prior art devices have not been effective in directing substantially all of the isotope's thermal energy towards the hot junction.

The invention described herein makes use of a novel arrangement in which this temperature differential is maximized in a manner for the first time being presented by this invention. Accordingly, the need for a heat transmitting wall 53 (FIG. 2) of the cup-shaped fuel chamber 27 as a requite to maximum heat transfer in the direction of the thermoelectric elements 58 will be appreciated as a requirement for the practice of the invention. Therefore, the cup-shaped fuel chamber 27 is preferably constructed of a singular piece of formed high temperature metal alloy which, in this environment, has been found to maximize the passage of thermal energy from the isotope fuel element 51 to the thermoelectric units 58.

Immediately adjacent to and in contact with the wall 53 is a thermally conductive electrically insulating layer 54 which functions to separate, electrically that is, the thermoelectric units generally designated as 58 one from another, except where bridging straps of metal have been specifically located to electrically interconnect the thermoelectric units 58.

It will be understood, of course, that at the outset of thermal energy conversion to electrical energy, there will of necessity be present in the isotope fuel element 51 a tremendous amount tf thermal energy which greatly exceeds the average energy needed by the thermoelectric elements. This is true because of the fact that the isotope utilized decays in a manner which logarithmically decreases the thermal energy's output of the unit as time passes. This aspect of the fuel element's characteristic life span calls for the need to provide a cooling medium in the region of the isotope fuel element 51, lest the heat generated therein do damage to the thermoelectric elements, the surrounding suspension, and the support system in the power supply. The need for cooling of course decreases as the isotope fuel element decays with the passage of time.

Figure 4:
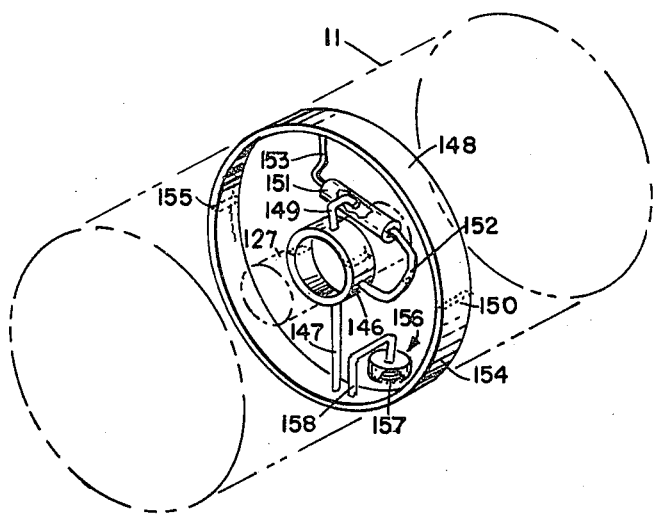
FIG. 4 is a three-dimensional illustration of the preferred embodiment of the heat-dissipating unit incorporated in the invention.

Therefore, there is provided a means to cool the unit that surrounds the isotope fuel element 51. One means to cool the unit is illustrated in FIG. 1 and FIG. 2. The preferred embodiment is shown in FIG. 4. As has been noted, the metal Dewar 29 reflects substantially all of the energy being released by the isotope fuel element 51, but to the extent that the supply of thermal energy exceeds the capability of the thermoelectric units 58 from converting this energy to electricity, there must be provided a means to dissipate the excess energy. The plate 53 upon which the thermal energy of fuel element 51 is directed is in thermal connection with the wall of the fuel chamber 27. Mounted about the periphery of the cup-shaped fuel element 27, which is seen to be part of the thermally conductive wall 53, are a plurality of radially aligned fins 39, which extend outwardly from the cup-shaped fuel chamber 27.

The cyindrical housing 11 of the power supply has provided therein an opening 41 which in turn communicates via a passage 42 to a space chamber 43, best seen in FIG. 2, which totally surrounds the cup-shaped fuel chamber 27. On the upper side of the fuel chamber 27, see FIG. 1, there is a second passage 44 which in turn communicates with a cooling medium flow control device 45, which in turn has an outlet port 46 which communicates with the water environment in which the power supply is to be operated. This unit, of course, must be recognized in this application as a gravity-responsive cooling system in which water that enters the opening 41 passes, due to convection currents, through the passage 42 into the space chamber 43 and thence through the second passage 44 to the cooling control device 45 and ultimately to the outlet port 46.

In the earlier stages of power development, a maximum flow of coolant fluid, in this case the water environment, is needed, and the cooling control device 45 remains in an open or fluid-passing capacity. With the passage of time and the inherent decrease in water temperature due to decay of the isotope fuel element 51, the need for cooling is lessened; and there is provided herein a temperature cooling control device 45. This controlling action may be accomplished by utilizing within the temperature responsive unit 47 a chemical substance whose physical state changes abruptly with the change in temperature. To be utilized here, for example, a substance such as zinc or sodium, whose vaporization point is sufficiently high may be incorporated in the temperature responsive unit 47 and so long as the temperature of the space chamber 43 is sufficiently high, the chemical substance in the temperature responsive unit 47 will remain in the vaporized state and effect through the feedback tube 48 a controlling force on the cooling control device 45. In this situation, the force being one which holds the cooling control device 45 in an open condition to permit the free passage of water through the system.

As noted above, the passage of time and inherent decreases in temperature of the system will of necessity result in a decrease in the ambient temperature of the space chamber 43; and once the temperature lowers to a point at which the chemical in the temperature responsive unit changes state with the concomitant closing of the cooling control device 45, there will result a cessation of water passage through the system. There may be a momentary condition at which the temperature present in the space chamber 43 rises to a point which exceeds the vaporization temperature of the water passing therethrough. This develops a back pressure which forces the water away from the space chamber 43 and back down through the passage 42. Should the temperature rise to a point sufficient to vaporize the chemical substance in the temperature responsive unit 47, the cooling control device 45 will of course open and the convection cooling of the system will start to function immediately.

As has been noted earlier, the heat transmitting wall 53 which separates the isotope fuel element 51 from the thermoelectric unit 58 has an additional layer of thermally conductive electrically insulating material 54 which functions to isolate the thermoelectric element mounts 56 and 57. These thermoelectric element mounts 56 and 57 are needed to provide a support for the thermoelectric elements 58, which at the ends closest to the isotope fuel element 51 experience tremendous heat for extended durations of time. Each of the thermoelectric element mounts 56 and 57 provides the dual function of supporting the thermoelectric units plus providing an electrical bridge to serially connect one thermoelectric unit to another.

There is contemplated in the practice of this invention the utilization of a plurality of different thermoelectric types of elements to accomplish the maximum utilization of thermal energy conversion to electrical powers.

It has been recognized that thermoelectric power will be maximized by the utilization of a multiple of different thermoelectric producing compounds, each compound having a known maximum efficiency over a predetermined temperature range.

Accordingly, it is contemplated that the thermoelectric elements 58 be composed of known multiples of thermoelectric materials, such as germanium silicon and lead telluride. The precise art of the conversion of thermal energy to electrical energy is fully set forth in the patent to J. P. McHugh et al. Ser. No. 3,073,883, which shows the incorporation of P type and N type materials to produce electrical energy in a manner similar to that utilized here. A full discussion of the phenomena is set forth in the above patent.

In the embodiment set forth here, the N type material has an excess of electrons present therein which are stimulated by the heat and thereby travel through the N type material. In this case the first thermal to electrical energy conversion appears across the germanium silicon element 59. This is a high temperature region because of its position relative to the isotope fuel element 51. The germanium silicon having the inherent property of sustaining for long periods of time the presence of the extreme heat liberated by the isotope fuel element 51. The germanium silicon element 59 is spaced apart from a lead telluride element 62 by a thermally conductive spacer 61, which thermally conductive spacer 61 functions to conduct both electrical and thermal energy therethrough while isolating the lead telluride from the possible molecular migrations across boundary lines between the lead telluride and the germanium silicon 62, 59, respectively.

The spacer 61 as well as the thermolectric mounts 57 are cup-shaped and thereby enhance the thermoelectric element's ability to withstand the possible sublimation of the elements in the regions where they are serially interconnected.

It is important to recognize that the lead telluride 62 and the germanium silicon 59 are physically weak in the tension stress mode, and their structural integrity is enhanced by the mounting of these elements in compression by an arrangement to be described hereafter.

At the left-hand end of the lead telluride element 62 is a strap 63 which is contemplated to be formed by an etching process which will establish the basic surface configuration to receive the thermoelectric elements 58. The straps 63 which receive their basic physical configuration through an etching process having machined surfaces 64 and 66 in mating contact with the thermoelectric elements 62 and 72.

Intermediate the thermoelectric elements 62 and 72 of the straps 63 is a flexible section 67 which provides a degree of flexibility to the bridging strap while simultaneously permitting electrical energy to pass through the flexible section and into the bismuth telluride element 72 of the P type material which comprises the next thermoelectric element.

For optimum generation of electrical power, there has been selected in this embodiment for the P type material a combination of serially connected thermoelectric elements of bismuth telluride 72 and lead telluride 73, and finally germanium silicon 74 spaced apart by an electrically conductive spacer 76 which functions in a manner similar to thermally conductive spacer 61. Each of the etched straps 63, of which only one has been designated in this figure, are spaced one from each other in a soft epoxy matrix material, 68, 69 and 71, which epoxy material functions to hold the thermoelectric elements separate from each other electrically while simultaneously providing a hermetic seal through which no moisture may pass into and about the thermoelectric elements 58.

Each of the thermoelectric elements generally designated as 58 are separated by insulation material 77 and 78. In the region immediately surrounding the germanium silicon elements 59 and 74 and along the entire area that is immediately adjacent the thermally conductive electrical insulating layer 54 is an insulating medium of microquartz fiber which has been selected because of its ability to withstand the tremendous temperatures present in this region.

As has been noted earlier, the efficiency of a thermoelectric unit's conversion of thermal energy to electrical energy is dependent upon the temperature differential experienced across the thermoelectric elements. In order to enhance and maximize this temperature differential, this power supply source being described contemplates the usage of the water temperature provided by the ocean environment as a cold junction cooling source. Since this power supply is to be operated at predetermined ocean depths in most applications, there will inherently be an ample supply of natural cooling to present a temperature differential at all times across the thermoelectric elements in this, the most efficient mode of operation. Air cooling of the cold junctions can also permit operation, but at a slight reduction of efficiency and power output.

The ocean water 90 enters a bridge support arrangement 91 which is constructed of a plurality of support sections 92 and 93, which in turn have mounted at the base of the support sections such as 93 and 92 spring elements 83. These spring elements 83 act to hold the thermoelectric elements in compression, which compressive loading aids the elements in withstanding heavy shock loading. Mounted intermediate the etched straps 63 and the spring elements 83 are anodized aluminum cooling columns 81 and 82. A plurality of these cooling columns such as 81 and 82 are provided for each of the thermoelectric element pairs in the system. These cooling columns have been anodized to provide a surface which is inherently electrically non-conductive, thermally conductive, and not susceptible to surface contaminates and destruction by the ocean water 90 that passes through sea water coolant openings 95 and 96 to totally surround the cooling columns 81 and 82. The anodized surface serves the important function of providing a layer of electrically insulating material spread over a large area which simultaneously affords a maximized cooling surface. This cold junction is a definite advance over the prior art approaches.

It is also contemplated that in the practice of this invention there be incorporated on each of the cooling columns 81 and 82, at their left-hand ends as viewed in this figure, a Teflon cover cap portion 84, 85 which is not clearly shown in this figure but which functions to physically separate the spring 83 from the anodized surface of the cooling columns 81. Maximum surface area of the cooling columns may be obtained by providing a variety of cross-sections such as that depicted by circular cross-section 97. The support sections 92 and 93 of the bridge support 91 are to be formed of a sintered stainless steel which will be impregnated with an organo-tin compound such as C$^e$CAP, a registered trademark of Oceonographic Industries, Inc., a carrier impregnated with bis (tri-n-butyltin) oxide, which material has the capacity to prevent the formation of algae type growths, which tend to appear on the surface of the cooling columns upon exposure to an ocean water medium for long durations of time. This chemical will be stored by the impregnation of the sintered stainless steel with the chemical for subsequent release when the entire power supply is placed in an ocean medium. This algae growth inhibitor has the inherent propensity to migate along the surfaces contiguous to and in contact therewith at support secions 92 and 93.

Accordingly, sleeve units 98 and 99 also of porous material impregnated with organo-tin compound, will be incorporated to enhance the migration of this algae inhibitor to the anodized surface of the cooling columns 81 and 82.

Referring again to FIG. 1, the following discussion will concern itself with the suspension system for the thermoelectric generator previously described. The importance of mounting the thermoelectric generator in a most secure manner is of utmost importance to the invention because the buoys in which these power supplies are to be located must be capable of being air dropped from great heights. Therefore the components of the power supply as well as the buoys will undergo great shock loading upon impact with the ocean.

In order to provide maximum shock isolation of the thermoelectric generator from the outside ocean medium, the cylindrical housing 11 has been provided with a plurality of radially aligned support rods 102, 103. These support rods, which are constantly in tension, have been secured to the annular rim 104. The rim 104 in turn has been integrally attached to shells 107 and 108. These shells 107 and 108 function to contain the thermoelectric generator and the fuel element 51. As has been noted earlier, the radially aligned support rods 102 and 104 are kept in tension. The tension is provided in rod 103 by a tension adjustment section 106. Of significance is the fact that the radially aligned support rods 102 and 103 are of a small diameter and made of stainless steel, thereby providing a very small heat loss path to the ocean medium. The shells 107 and 108 are joined to the bridge 91 at shell bridge joints 109, 111, to thereby avoid potential ocean contamination of the volume that surrounds the fuel element and the thermoelectric generator. The shell 108 is integrally secured to the fuel chamber 27 at shell fuel chamber joint 112 and 113. The entire volume that surrounds the fuel chamber and lies between the end shells 107 and 108 is to be filled with a high molecular weight inert gas 114, such as krypton or xenon, to minimize the escape of thermal energy from within the fuel chamber area. This, of course, is most important, as the isotope fuel element 51 decays, thereby liberating less and less thermal energy as time passes. The remaining volume within the cylindrical housing 11 and the remaining volume 114 is filled with a suitable insulation material such as Min-K-1300 with outer layers of Fiberglas. The above arrangement has proven itself to be the most advantageous structural configuration for holding the fuel capsule or element and the thermoelectric elements in the desired axial alignment which is needed to maintain maximum utilization of the thermal energy liberated by the isotope fuel element 51. As has been pointed out earlier, this axial alignment arrangement allows the persons handling the power supply to readily insert the fuel element and maintain the thermoelectric generator prior to is deployment into the ocean.

Figure 3:
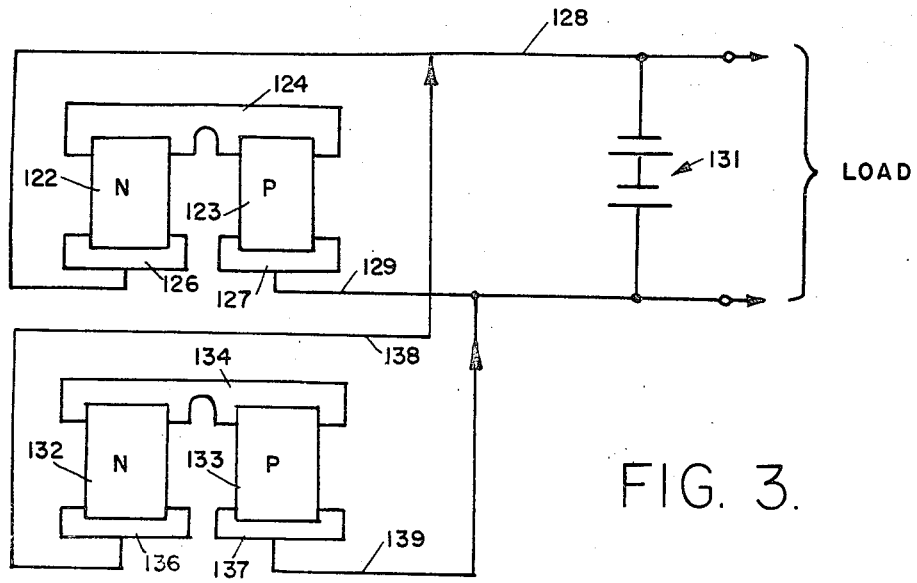
FIG. 3 is a schematic illustration of the manner in which the thermoelectric elements are interconnected.

Reference is now made to FIG. 3 which sets forth a schematic arrangement which is meant to illustrate the manner in which the thermoelectric elements will be electrically interconnected. While FIG. 1 as well as FIG. 2 illustrates the thermoelectric generator in cross-section, it is to be understood that this unit takes on a cylindrical configuration in its ultimate form. Therefore, in order to enhance reliability of the thermoelectric generator, half of the thermoelectric elements are connected in series. The remaining half of the thermoelectric elements are also connected in series as a unit. These individual series connected units are then in turn connected electrically in parallel. This parallel arrangement can be seen in a study of FIG. 3 where an N type thermoelectric element 122 is serially connected to a P-type thermoelectric element 123 via an etched bridge strap 124 which strap was discussed in some detail earlier. The N type thermoelectric element 122 has a thermoelectric mount 126 as does the P type thermoelectric element 123 have a thermoelectric mount 127 in intimate contact with the P type thermoelectric element. The thermoelectric mount 126 has an electric connection 128 which is electrically connected to one side of a pair of storage batteries 131. The remaining thermoelectric mount 127 in a similar manner has an electrical connection 129 secured to the other side of a pair of storage batteries 131. This schematic representation therefore illustrates the typical electrical configuration which half of the thermoelectric units will experience in the actual unit. A second set of thermoelectric elements 132 and 133 which are respectively an N type thermoelectric element and P type thermoelectric element are interconnected by an etched bridge strap 134 in the same manner as the unit just described. Each of the thermoelectric elements 132 and 133 having respective thermoelectric mounts 136 and 137 which have attached thereto respectively electrical connections 138 and 139. These electrical connections 138 and 139 are electrically connected respectively with the electrical connections 128 and 129. It is therefore seen that this electrical arrangement is a parallel configuration and thereby affords the power supply a safety factor should one of the thermoelectric element units fail for some reason. In this instance there would remain at least half the power supply remaining to charge the batteries and drive the loads placed on the unit. The use of small storage batteries in this manner also permits the utilization of very large amounts of electrical power for short periods of time when the average amount of power so used does not exceed the capacity of the thermoelectric generator.

Reference is now made to FIG. 4. In this figure there is illustrated the preferred heat dissipating system to be employed in this invention. The earlier descriptions with reference to FIGS. 1 and 2 employ the use of the ocean water as a cooling medium.

In the preferred embodiment there will be employed a closed loop system which is comprised of an annular ring tube or conduit 146 which surrounds the schematically illustrated cup-shaped fuel chamber 127. This annular ring tube 146 may be termed a boiler type unit in that the ring is partially filled with a high boiling temperature substance such as mercury. Communicating with the annular ring tube 146 are a vapor tube 149 as well as a hollow tube 147 which extends radially from the annular ring tube 146 to a circumferential hollow rim or conduit 148. This hollow rim as can be seen from the dotted lines 150, 155, is partially filled with the same type of fluid that is present in the annular ring tube 146. This circumferential hollow rim 148 is located along the outer surface of the cylindrical housing 11 and in this position is immediately adjacent the ocean water medium with a large interjoining area and thereby permits the transfer of heat from the hollow rim 148 to the ocean water that surrounds the system. As has been noted, a vapor tube or conduit 149 extends radially upward from the annular ring tube 146 and communicates with a vapor separator unit 151 which is in the form of an enlarged tubular section. The vapor separator unit 151 having a fluid return tube 152 which extends downwards and is in fluid communication with the annular ring tube 146. At the left-hand end of the vapor separator unit 151 there is a vapor tube 153 which vapor tube communicates with the circumferential hollow cooling ring or condenser 148. At the base of the hollow circumferential rim 148 there is a tube 158 which interconnects the circumferential rim 148 with a system pressure control unit 156 which system pressure control unit 156 has a diaphragm 157 in intimate contact with the ocean medium. It is therefore seen that the overall system pressure experienced in the tube arrangement just defined will bear a direct relationship to the ambient pressure existing in the environment surrounding the entire power supply. Therefore, when this system is above the surface of the ocean the ambient pressure will be that of atmospheric pressure and as the system is lowered into the depths of the ocean the overall pressure in the system will bear direct functional relationship with the pressure presented by the ocean at any predetermined depth. In operation this unit functions as follows:

During the early stages of the isotope half-life where tremendous levels of energy will be liberated, the fluid in the annular ring tube 146 will be brought up to a very high temperature and then vaporized. The amount of heat then liberated will be a function of the heat of vaporization of the fluid at the pressure level being experienced by the system. The vapor that appears in the annular ring tube 146 passes upwards through the vapor tube 149 and thence to the vapor separator unit 151 which will permit any of the fluid which may have accompanied the vapor to drain backward and downward via the liquid return tube 152 into the annular ring tube 146. The vapor then will travel upwards via the vapor tube 153 and into the circumferential hollow condenser rim 148 where it will experience the cooling action brought about by the ocean medium in contact with the circumferential hollow rim 148. The condensed vapor will then drain downwardly into the portions shown at dotted lines 155. As more and more fluid is vaporized a natural convection pattern will occur. With the fluid passing upwardly through the hollow tube 147 into the ring 146 and thence through the vapor tubes 149, 153 to the circumferential rim 148.

As time passes and the amount of thermal energy liberated decreases to a point where there is insufficient heat to bring about sufficient vaporization of the fluid 154 this convection process will cease and then the only means of transmitting or dissipating any of the heat from the fuel chamber 27 will be the very small column of fluid that is present in the hollow tube 147. It is therefore evident that as the half-life and the related thermal energy decrease this system just defined will automatically cease the dissipation of heat from the fuel chamber area 27 thereby permitting substantially all of the thermal energy to be directed into the thermoelectric elements not shown in this figure. An important feature of this arrangement is the system pressure control unit 156. When the system is being transported to the ocean environment the ambient pressure present will be that of the air pressure surrounding the unit and therefore the fluid 154 of the system will boil and vaporize at a much lower temperature than when the unit is submerged in the ocean where the pressure experienced is much greater. It is therefore seen that once the system has been placed within the ocean the overall unit will be capable of function at a much higher temperature level which of course is important when the early stages of isotope half-life are liberating great amounts of thermal energy. It should also be recognized that while the heat dissipation system just described shows but one vapor separator, the invention contemplates a plurality of radially positioned vapor tubes and related hollow tubes to permit the heat dissipating system to function in any position about the horizontal axis of the thermoelectric generator.

This unit has the decided advantage of function with a large range of differing isotope fuel elements that liberate heat at different rates and with differing half-lives, thus making the generator more versatile than has ever before been possible, in that the same generator can be fueled with an isotope selected for generator mission life and isotope availability without undue regard having to be given to half-life relative to generator design. Prior to this invention it has been the custom to use isotopes for missions extending to only one half-life, thus rendering less useful many potentially low-cost and safe isotopes. In conclusion it may be added that it does this in a wholly automated manner in a predetermined fashion to thereby guarantee the desired life of the power supply unit.

What is claimed is:

1. An air-dropped, light-weight power supply for unattended use at ocean depths, comprising, in combination:
   a cylindrical housing having a power supply suspension system mounted therein,
   said power supply suspension system comprising a plurality of radially mounted suspension members secured to said cylinder and to a power supply housing position along said cylinder's central axis,
   said power supply housing having in an axial aligned arrangement a thermal energy liberating means,
   said thermal energy liberating means having substantially all of its thermal energy directed in one direction along said axis,
   a thermoelectric power generating means positioned to receive substantially all of said thermal energy,
   said thermoelectric power generating means having a cold junction in intimate communication with said ocean.

2. The combination set forth in claim 1 wherein said thermal energy liberating means is comprised of energy source having substantially all of its releasable energy of a predetermined wavelength spectrum.

3. The combination set forth in claim 2 wherein said energy source is positioned within a thermally reflective unit which encloses said energy source so that a portion thereof is open for liberation of energy in said one direction.

4. The combination set forth in claim 3 wherein said thermally reflective unit has a reflective inner surface having a reflective refractive index which matches said wavelength spectrum of said energy source whereby substantially all of said thermal enerby source's energy is liberated in said one direction.

5. The combination set forth in claim 1 wherein said thermoelectric power generating means is comprised of a plurality of thermoelectric elements mounted in axial alignment with said cylindrical housing to receive all of said thermal energy for conversion to electrical energy.

6. The combination set forth in claim 5 wherein said mounting of said thermoelectric elements in axial alignment provides a highly shock-resistant arrangement, said thermoelectric elements having a physically thermally conductive mating engagement with a plurality of cooling elements, said cooling elements being in intimate contact with said ocean upon submersion to said ocean depths.

7. The combination set forth in claim 5 wherein said thermoelectric elements are insulated from thermal energy's heat losses in a radial direction in said cylindrical housing by a medium of inert gas of high atomic weight.

8. The combination set forth in claim 1 wherein said thermal energy liberating means comprises a radioisotope.

9. The combination set forth in claim 8 wherein said radioisotope is Thulium–170.

10. A heat dump system for a thermal energy releasing source comprising a
first conduit surrounding said thermal energy releasing heat source,
a second conduit spaced radially away from said first conduit and forming a closed loop, said second conduit completely surrounding said first conduit and said heat source and being in contact with a coolant medium,
a third conduit and a fourth conduit interconnecting respectively said second conduit and said first conduit and said first conduit and said second conduit,
said first, second conduits being partially filled with a liquid,
said third conduit interconnecting said second and first conduits, always being filled with said liquid,
whereby when said liquid in said first conduit is heated to the point of vaporization, the vapor that occurs will enter said fourth conduit and said second conduit where said vapor will condense due to the presence of said coolant medium.

11. The heat dump system of claim 10 wherein said third and fourth conduits are vertically positioned relative to said first and second conduits.

12. The heat dump system of claim 10 wherein said fourth conduit has means to separate any said liquor from said vapor and return said separated liquid to said first conduit.

13. The heat dump system of claim 10 wherein said second conduit has a fluid connection to a pressure control means, said pressure control means controlling the internal pressure of said heat dump system dependent upon the pressure present in said coolant medium to thereby vary the temperature at which said first conduit and related fluid will vaporize.

14. An air-dropped, light-weight power supply system for unattended use in the waters of the ocean, comprising, in combination,
a cylindrical housing having a power supply suspension system mounted therein,
said power supply suspension system comprising a plurality of radially mounted suspension members secured to said cylinder and to a power supply housing positioned along said cylinder's central axis,
said power supply housing having in an axial aligned arrangement a thermal energy liberating means,
said thermal energy liberating means having substantially all of its thermal energy directed in one direction along said axis,
a thermoelectric power generating means positioned to receive substantially all of said thermal energy,
said thermoelectric power generating means having a cold junction in intimate communication with said ocean water,
a first conduit surrounding said thermal energy liberating means,
a second conduit spaced radially away from said first conduit and forming a closed loop, said second conduit being in contact with said ocean water,
a third conduit and a fourth conduit interconnecting respectively said second conduit and said first conduit and said first conduit and said second conduit,
said first, second conduits being partially filled with a fluid,
said third conduit interconnecting said second and first conduits, always being filled with said fluid,
whereby when said fluid in said first conduit is heated to the point of vaporization, the vapor that occurs will enter said fourth conduit and said second conduit where said vapor will condense due to the presence of said ocean water.

15. The combination set forth in claim 14 wherein said radially spaced second conduit completely surrounds said first conduit and said heat source.

16. The combination set forth in claim 14 wherein said third and fourth conduits are vertically positioned relative to said first and second conduits.

17. The combination set forth in claim 14 wherein said fourth conduit has means to separate any of said fluid from said vapor and return said separated fluid to said first conduit.

18. The combination set forth in claim 14, wherein said thermal energy liberating means is a radioisotope.

19. The combination set forth in claim 18, wherein said radioisotope is Thulium–170.

20. A heat dump system for a thermal energy releasing source comprising
a first annular ring tube surrounding said thermal energy releasing heat source,
a second annular ring tube concentric with and spaced away from said first annular ring tube and forming a closed loop, said second annular ring tube being in contact with a coolant medium,
a first and second conduit interconnecting respectively said second and first annular ring tubes and said first and second annular ring tubes,
said first and second annular ring tubes being partially filled with a liquid,
said first conduit interconnecting said second and first annular ring tubes always being filled with said liquid,
whereby when said liquid in said first annular ring tube is heated to the point of vaporization, the vapor that occurs will enter said second conduit and said second annular ring tube where said vapor will condense due to the presence of said coolant medium.

21. The heat dump system of claim 20 wherein said second conduit has means to separate any said liquid from said vapor and return said separated liquid to said first annular ring tube.

22. The heat dump system of claim 20 wherein said second annular ring tube has a fluid connection to a pressure control means, said pressure control means controlling the internal pressure of said heat dump system dependent upon the pressure present in said coolant medium to thereby vary the temperature at which said first annular ring tube and related fluid will vaporize.

References Cited
UNITED STATES PATENTS

| | | | |
|---|---|---|---|
| 2,996,889 | 8/1961 | Roeder | 136—204 X |
| 3,035,416 | 5/1962 | Nagner | 136—204 X |
| 3,035,419 | 5/1962 | Wigert | 62—119 |
| 3,075,030 | 1/1963 | Elm et al. | 136—208 |
| 3,090,206 | 5/1963 | Anders | 136—204 X |
| 3,169,378 | 2/1965 | Taylor | 136—203 |
| 3,262,820 | 7/1966 | Whitelaw | 136—202 |
| 3,266,944 | 8/1966 | Spira et al. | 136—202 X |
| 3,291,648 | 12/1966 | Sheard et al. | 136—212 |
| 3,347,711 | 10/1967 | Banks et al. | 136—202 |
| 2,903,857 | 9/1959 | Lindenblad | 136—204 X |
| 3,050,948 | 8/1962 | Jones | 136—204 X |
| 3,304,206 | 2/1967 | Burdich et al. | 136—211 |

FOREIGN PATENTS 817,076  7/1959  Great Britain.

A. B. CURTIS, Primary Examiner

U.S. Cl. X.R.

62—119; 136—205, 212, 242